(12) United States Patent
McCormick et al.

(10) Patent No.: US 8,655,753 B2
(45) Date of Patent: Feb. 18, 2014

(54) LEVELED-FLOW REPLENISHMENT USING DEADBAND LIMITS

(75) Inventors: Kevin L. McCormick, Fremont, WI (US); Jayne M. Kelly, Flower Mound, TX (US); Wesley J. Knoespel, Green Bay, WI (US)

(73) Assignee: Ziti Technologies Limited Liability Company, Dover, DE (US)

( * ) Notice: Subject to any disclaimer, the term of this patent is extended or adjusted under 35 U.S.C. 154(b) by 432 days.

(21) Appl. No.: 11/965,424

(22) Filed: Dec. 27, 2007

(65) Prior Publication Data

US 2009/0138384 A1 May 28, 2009

Related U.S. Application Data

(60) Provisional application No. 60/990,735, filed on Nov. 28, 2007.

(51) Int. Cl.
G06Q 10/08 (2012.01)
G06Q 30/04 (2012.01)
G06Q 10/10 (2012.01)

(52) U.S. Cl.
USPC .............. 705/29; 705/22; 705/28; 705/330; 705/336

(58) Field of Classification Search
None
See application file for complete search history.

(56) References Cited

U.S. PATENT DOCUMENTS

| 4,737,910 A * | 4/1988 | Kimbrow ............... 705/28 |
| 5,608,621 A | 3/1997 | Caveney et al. |
| 5,611,051 A | 3/1997 | Pirelli |
| 5,712,989 A | 1/1998 | Johnson et al. |
| 5,727,164 A | 3/1998 | Kaye et al. |
| 5,819,232 A * | 10/1998 | Shipman ............... 705/8 |
| 5,946,662 A * | 8/1999 | Ettl et al. ............... 705/8 |
| 5,953,707 A | 9/1999 | Huang et al. |
| 6,006,196 A * | 12/1999 | Feigin et al. ............ 705/10 |
| 6,078,900 A * | 6/2000 | Ettl et al. ............... 705/28 |
| 6,081,789 A | 6/2000 | Purcell |
| 6,219,653 B1 * | 4/2001 | O'Neill et al. .......... 705/400 |
| 6,341,269 B1 | 1/2002 | Dulaney et al. |
| 6,418,416 B1 * | 7/2002 | Rosenberg et al. ...... 705/28 |
| 6,609,101 B1 * | 8/2003 | Landvater ............. 705/10 |
| 6,622,127 B1 | 9/2003 | Klots et al. |
| 6,889,197 B2 * | 5/2005 | Lidow ................. 705/10 |
| 7,177,825 B1 | 2/2007 | Borders et al. |
| 2003/0163364 A1 * | 8/2003 | Piercy et al. ........... 705/10 |
| 2003/0212602 A1 | 11/2003 | Schaller |
| 2003/0216969 A1 | 11/2003 | Bauer et al. |
| 2005/0060246 A1 | 3/2005 | Lastinger et al. |
| 2005/0288989 A1 * | 12/2005 | Kim et al. ............. 705/10 |
| 2006/0089867 A1 | 4/2006 | Sakuma et al. |
| 2007/0038323 A1 * | 2/2007 | Slocum et al. .......... 700/99 |

FOREIGN PATENT DOCUMENTS

| WO | 0043931 A2 | 7/2000 |
| WO | 0241110 A2 | 5/2002 |

* cited by examiner

*Primary Examiner* — Fateh Obaid
(74) *Attorney, Agent, or Firm* — Knobbe Martens Olson & Bear LLP (57) ABSTRACT

Inventory replenishment that levels the flow of products from a collection of supplying distribution centers (DCs) to a receiving DC. Products are shipped in calculated, predetermined quantities at calculated, predetermined intervals to match the outflow rates at the receiving DC. Inventory levels at the receiving DC are monitored daily, and exceptions or adjustments to the shipment pattern (e.g., quantities and time intervals) are executed in a systematic manner when they stray outside of calculated minimum and maximum levels.

27 Claims, 3 Drawing Sheets

FIG. 1

LEVELED-FLOW REPLENISHMENT USING DEADBAND LIMITS

CROSS-REFERENCE TO RELATED APPLICATION

This application claims the benefit of U.S. Provisional Patent Application Ser. No. 60/990,735 filed Nov. 28, 2007, the entirety of which is incorporated by reference herein.

BACKGROUND

Retailers strive to maintain sufficient inventories of products to satisfy consumer demand. Conventional replenishment methods are based on the retailer re-ordering quantities of products. For example, the retailer orders a particular quantity of a product based on a forecasted demand for the product. When the inventory level drops to a re-order point set by the retailer, an additional quantity of the product is ordered. Such existing systems require the retailer to actively participate in the replenishment process. Additionally, the re-ordered product may inefficiently use the available space in the transport means depending on the quantity re-ordered. For example, the re-ordered quantity may only fill a portion of a truck trailer or other shipping container, leaving the unused portion empty ultimately resulting in higher shipping costs. Further, the existing replenishment systems result in highly variable shipment patterns.

SUMMARY

Embodiments of the invention level the flow of products from one location to another. In an embodiment, an expected outflow of a product from a location and a desired inventory level for the product at the location are determined. Time intervals and a quantity of the product to ship to the location during each of the defined time intervals are defined as function of the determined outflow of the product and the desired inventory level. Minimum and maximum inventory levels for the product at the location are calculated. A current inventory level is compared to the calculated minimum and maximum inventory levels. Based on the comparison, the shipments of the products are adjusted to level the flow of products.

BRIEF DESCRIPTION OF THE DRAWINGS

Corresponding reference characters indicate corresponding parts throughout the drawings.

DETAILED DESCRIPTION

Figure 1:
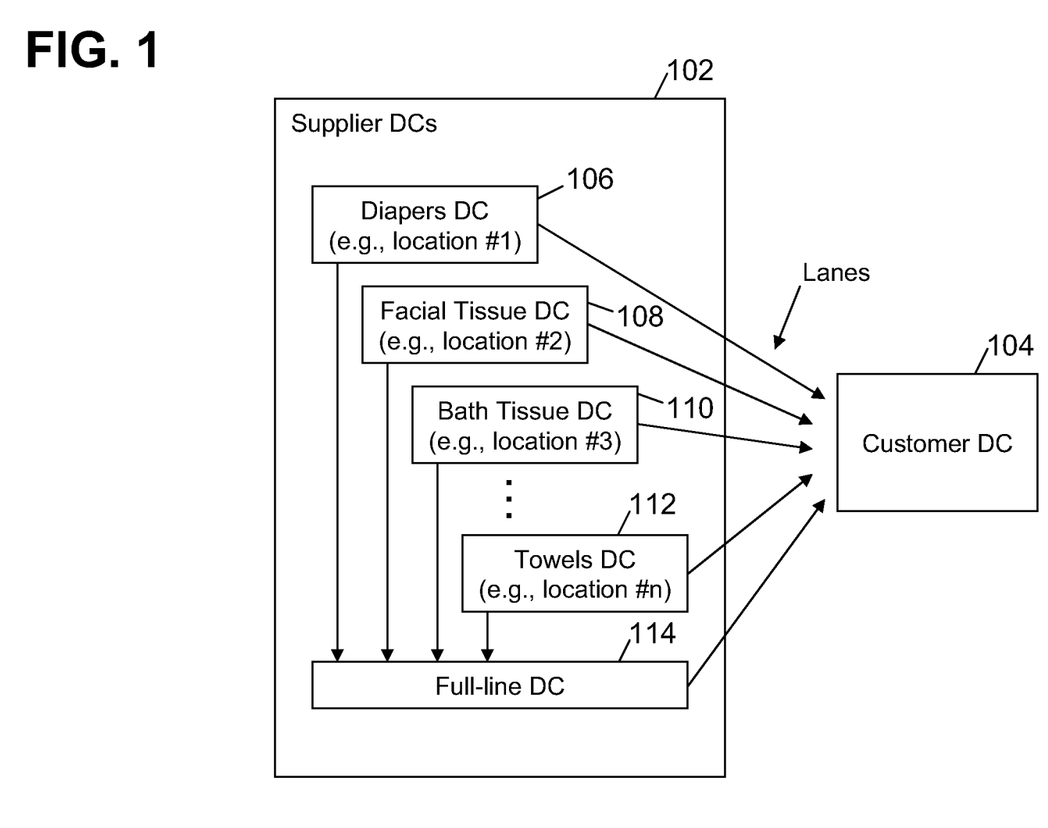
FIG. 1 illustrates lanes between supplier distribution centers and a customer distribution center.

Embodiments of the invention replenish product inventories levels based on maximum and minimum inventory levels. A steady supply stream of products is sent to a retailer, distribution center (DC), customer, or the like, such as shown in FIG. 1. In FIG. 1, supplier DCs 102 supply a customer DC 104 with products. When an inventory level for a product strays beyond a determined maximum or minimum deadband limit or level, a one-time exception to the steady supply stream is generated that moves the inventory level back to the calculated ideal inventory level as defined herein. The exception either withholds the product from a scheduled shipment or sends additional product on a scheduled shipment (if capacity is available) or on a special shipment. Aspects of the invention also determine the size of the exception. The regular shipments and exceptions systematically level the inventory flow. A spreadsheet, special purpose application program, or other computer-executable instructions implement the operations described herein.

Aspects of the invention reduce variability in the shipment patterns and intelligently allocate distribution resources of both the supplier and customer. Both the supplier and customer benefit by knowing in advance when and how much product will be shipped and received thereby eliminating confusion, reducing handling errors, and the like. The regular shipments may be timed to coincide with known outflow patterns of the customer DC 104 thereby reducing the amount of time the product is held at the customer DC 104 and the inventory level at the customer DC 104. The shipments may also be synchronized with the supplier's production schedules.

While embodiments of the invention involve shipments via a truck, other transport means are within the scope of the invention. For example, the transport means may include car, truck, rail, boat, airplane, shipping containers, or any other means for transporting goods from one location to another. Further, while embodiments of the invention as described with reference to DCs, any movement of products from one location to another is within the scope of the invention. For example, stock transfers internal to a warehouse are contemplated by aspects of the invention. In addition, aspects of the invention are not limited to any particular type or class of products. For example, the products described herein may include consumer goods, hospital supplies, military material, or any other items or goods.

Referring again to FIG. 1, several supplier DCs 102 supply the customer DC 104. In the example of FIG. 1, the customer DC 104 gets diapers from a supplier DC 106 at location #1, facial tissue from another supplier DC 108 at location #2, bath tissue from another supplier DC 110 at location #3, and towels from another supplier DC 112 at location #n (where n is a positive integer value). The operations described herein for designing shipments are applied to each lane, or each pair of supplier DC 102 and customer DC 104. The day-of-week arrivals of shipments at the customer DC 104 vary in an embodiment (e.g., to stagger arrivals). A full-line supplier DC 114 ships exception trucks that include shipments of products that span multiple single-line DCs.

While FIG. 1 illustrates a movement of products from supplier DCs 102 to the customer DC 104, embodiments of the invention are applicable to the movement of products from manufacturing DCs to full-line DCs such as full-line DC 114, from customer DCs such as customer DC 104 to retail stores, and the like.

Figure 2:
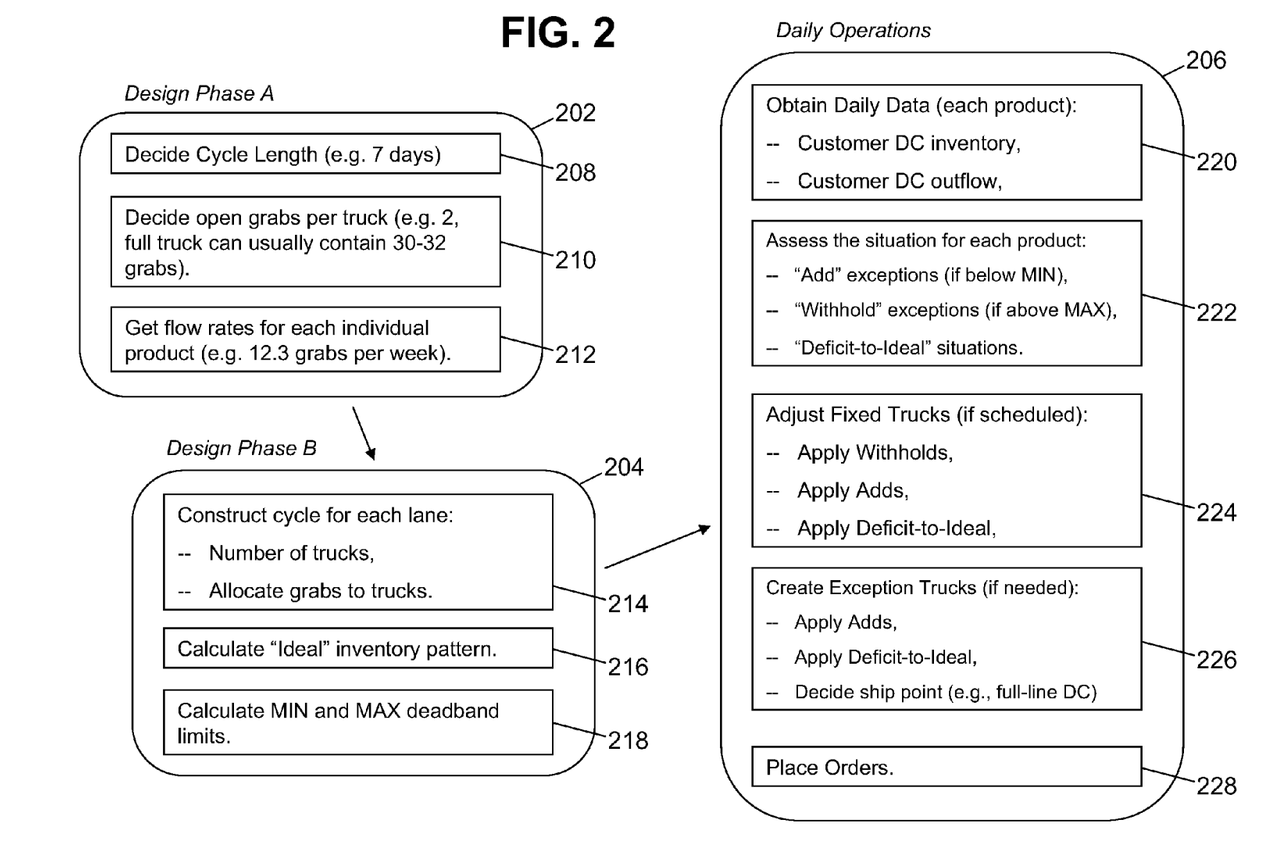
FIG. 2 illustrates operations performed to allocate shipments between locations.

Referring next to FIG. 2, exemplary operations allocating shipments are illustrated. In the example of FIG. 2, there are two design phases, design phase A 202 and design phase B 204, along with daily operations 206. A decision is made as to which products will be managed using the system. A forecast of the average DC outflow for each product is obtained through existing forecasting methods. Outflow represents a quantity of product leaving a location (e.g., a DC). The timeframe covered by the forecast can be typically three months. A decision is made as to what cycle length will be implemented in the system at 208, the number of trucks needed, the number of open grabs per truck at 210, and the number of grabs per week at 212. In an embodiment, a grab is any set or fixed amount of product such as the quantity of the product that fits on a standard pallet or truckload stack. A typical cycle length is 7 days, since retailers' sales patterns typically have a strong day-of-week effect. The 7-day cycle is assumed in what follows. The method may also be implemented using more than one cycle length. The DC outflow for each product is expressed in units of product-per-week. The products' outflows are summed to obtain a total weekly volume to be shipped. This total volume is then allocated at 214 to trucks in a way that minimizes stock keeping unit (SKU) complexity (i.e. number of different products on a truck), and does not violate restrictions such as brand groupings and weight limits. Grabs are allocated in a way that avoids high fluctuations in a calculated ideal inventory pattern for each product (e.g., SKU) across the cycle at 216. In an embodiment, strategic overallocation occurs as it is cheaper to withhold grabs than to add grabs to an exception truck. The result is a collection of trucks that deliver set (or fixed or predefined) loads at set intervals. This process occurs for each lane (e.g., shipper/supplier DC and customer DC combination).

Some or all of the operations illustrated in FIG. 2 may be performed by a computing device. For example, a human enters the truck allocations or other computations into an order management or placement system. In other embodiments, instructions executed by a computing device enter the information into the order management or placement system.

As an example, say there were three trucks: Trucks A, B, and C. A decision is made as to which weekday each truck is to arrive at the customer DC. Each truck is fixed to carry the same amounts of the same products for each regular or set shipment, and may include some exception shipments as described below. For example, every week on the fixed weekday, Truck A arrives at the customer's DC carrying the same fixed quantity and type of product. The weekday assignments, quantity, and type or kind of products carried by Trucks A, B, and C are fixed with every shipment, but may differ among Trucks A, B, and C. The trucks ship whole grabs, but with some space open to absorb variation.

Once the trucks have been determined along with their shipping schedules, prior to implementation, mathematical analyses of both the "structural" inventory pattern induced by the shipping schedule and the statistical aspects of the historical DC outflow are performed. The results of these analyses are deadband inventory limits on each product. Minimum and maximum deadband limits are calculated at 218. The deadband limits are established to strategically ensure that inventory will not stray beyond the limits for a reasonably long period of time (e.g., two weeks) unless there is a dramatic change in DC outflow patterns.

In an example, "L" is the maximum number of days between shipments. The minimum limit represents the forecasted maximum outflow from a DC over L−1 days plus a safety stock value. The safety stock value is calculated using existing formulas of "z-factor" times the standard deviation times the square root of a time value. In an embodiment, the z-factor represents a value selected from a statistical normal distribution table that corresponds to a prescribed probability level. The prescribed probability level represents the probability that the inventory level will not go to zero. The level is selected to statistically protect against the inventory becoming totally depleted (e.g., the inventory level dropping to zero). For example, the prescribed probability level is selected in the range of 80%-99%. In an embodiment, the minimum deadband limit is the sum of the expected outflow over L−1 days and a safety stock calculation using L−1 days such as a Z factor times the daily outflow standard deviation from the customer DC for the product times the square root of L−1.

$$\text{MIN} = \text{Flow}^*[(L-1) + 2^*Std^*sqrt(L-1)] \quad (1)$$

The portion of equation (1) within the hard braces is the minimum deadband limit expressed in days. Multiplying this value by the Flow converts the minimum deadband limit to grabs.

In an embodiment, the maximum deadband limit is the sum of the expected outflow over L−1 days and a safety stock calculation using, as shown in equation (2) below.

$$\text{MAX} = \text{MIN} + \text{Swing} + 2^*\text{Buffer} \quad (2)$$

The buffer is twice the standard deviation of the outflow rate from the customer DC for the product times the square root of N−1, where N is a "leave alone" period in days (e.g., 7 or 14). The inventory level at the Customer DC varies over time due to the outflow standard deviation. These regular (e.g., daily) variation amounts accumulate over time to form what is known as an unconstrained random walk. Even when the variability is stable (e.g., behaving according to a constant standard deviation), the inventory level is not be tied or held to the ideal level. Rather, the inventory level wanders in practical applications. The buffer is calculated as the statistically maximum amount that the inventory level could wander in one direction over a particular number of days (e.g., 14 days). The buffer value applies to wandering in both directions, so the buffer value is doubled in the MAX calculation in equation (2). In an embodiment, the buffer is calculated as an ordinary safety stock calculation using a prescribed number of days as the time value.

Once the regular shipments commence, DC inventory is assessed or checked regularly (e.g., daily) against the deadband limits for each product. The timeframe for assessing the DC inventory is dependent on, for example, the frequency of data from the DCs and the frequency of the trucks leaving the DCs. FIG. 2 illustrates exemplary operations that are performed daily. In an embodiment, the operations are performed in the order shown in FIG. 2.

In an embodiment, an application (e.g., applet) downloaded by a DC obtains the inventory levels (e.g., inventory level and outflow) for products of interest and communicates those levels (e.g., via a network such as the Internet) to a central server (e.g., the supplier server in FIG. 3) on a regular basis (e.g., daily) at 220. For example, the applet queries a database local to the DC to obtain the inventory levels.

For each product, the obtained data is assessed at 222. For any product whose inventory falls below the minimum or lower deadband limit, a calculation is performed to see how much additional product should be sent in the next fixed or exception shipment to bring the inventory back to an "ideal" inventory level according to the structural inventory pattern that is centered inside the deadband. The ideal inventory pattern is viewed across a complete cycle, assumes no outflow variability, and is induced by the shipping schedule in an embodiment. Additional supply shipments of this sort are referred to as "add exceptions" and are allocated to the regular or fixed shipments if space on such shipments is available. Otherwise, the additional supply shipments are added to one or more "exception" trucks if such a truck is available.

In an embodiment in which a limited number of trucks is available, the trucks are designed, built, or loaded according to a product priority. A value represents the product priority and reflects an interest in the product. For example, a retailer may request a particular brand, type, or category of item take priority over other items if only a limited number of trucks are available during a particular time period. Embodiments of the invention factor in the priority level when allocating grabs to a truck. In other embodiments, the allocation may be a factor of an ordering of products according to inventory levels (e.g., those products farthest from their ideal inventory level have the highest priority).

For any product whose inventory falls above the maximum or upper deadband limit, a calculation is performed to see how much product should be withheld from the next fixed shipment to bring the inventory back inside the deadband limits but not below its ideal inventory level. Such a calculation results in a "withhold exception."

For any product whose inventory is within the limits, no adjustment is made unless there is a fixed or exception truck that is not completely full. If there is a less-than-full fixed or exception truck, product inventory levels are analyzed to identify those products that have a deficit-to-ideal. Quantities of those products whose inventory levels fall below their ideal inventory level may optionally be added to the exception truck(s). The added quantities do not bring the inventory levels of any of these products above their ideal level. This process improves efficiency by utilizing existing empty space helping prevent the need for future exception shipments of those products that helped fill the exception truck.

The fixed trucks are adjusted at 224 according to the add, withhold, and deficit-to-ideal shipments created in 222. If needed, exception trucks are created at 226. The add exceptions and deficit-to-ideal shipments are applied to the exception trucks. The ship point for each exception truck is based on the contents of the truck (e.g., the DC of the products on the truck). Orders are placed at 228.

Some of the operations in 206 are performed in the order shown to implement aspects of the invention, achieve efficiency, or achieve other advantages. For example, the withholds in 224 are applied to the fixed trucks to create room on the trucks for any adds to then be applied at 226. This ordering helps to avoid extra shipments by efficiently utilizing space on the trucks. In other embodiments, some of the operations shown in FIG. 2 are performed in a different order than shown, or the order is immaterial. In an embodiment, order does not matter for the operations in 220 and 222. Further, some of the operations may be performed simultaneously (e.g., the determination of the add and withhold exceptions). As another example, when loading exception trucks, the add exceptions take priority over the deficit-to-ideal grabs and are allocated before the deficit-to-ideal grabs are allocated. If there is remaining volume on the trucks after all the add exceptions have been allocated, the deficit-to-ideal grabs are allocated.

Periodically, or any time there is reason to believe that the collection of DC outflow averages have changed significantly, the system design may be reassessed. For example, the truck collection is re-designed or re-built to match newly forecasted DC outflow rates. The DC outflow rates may be forecasted explicitly (e.g., by a human or computer), or be adjusted over time as the inventory levels for the products stray beyond the minimum or maximum deadband limits.

An option on designing the trucks is to intentionally leave some space that can be used to help avoid the need for exception trucks by allocating volume from products below the lower deadband limit to the unused space. This space can also be used to add volume of below-ideal products to bring their inventories back up to nearer their ideal levels. A single customer DC is typically supplied by multiple source DCs (e.g. diapers from one source DC, facial tissue from another). This creates an opportunity to source exception trucks from a single full-line DC. Instead of potentially having one or more exception trucks sent from a collection of the source DCs, these orders can be grouped together into exception trucks shipped by the full-line DC. This can help reduce the number of exception trucks and hence the amount of empty space on the exception trucks.

The method described with reference to FIG. 2 may be applied to multiple lanes such as shown in FIG. 1. Special trucks can aggregate all lanes' residual volume and ship from a producer DC that warehouses all of the producer's products.

Figure 3:
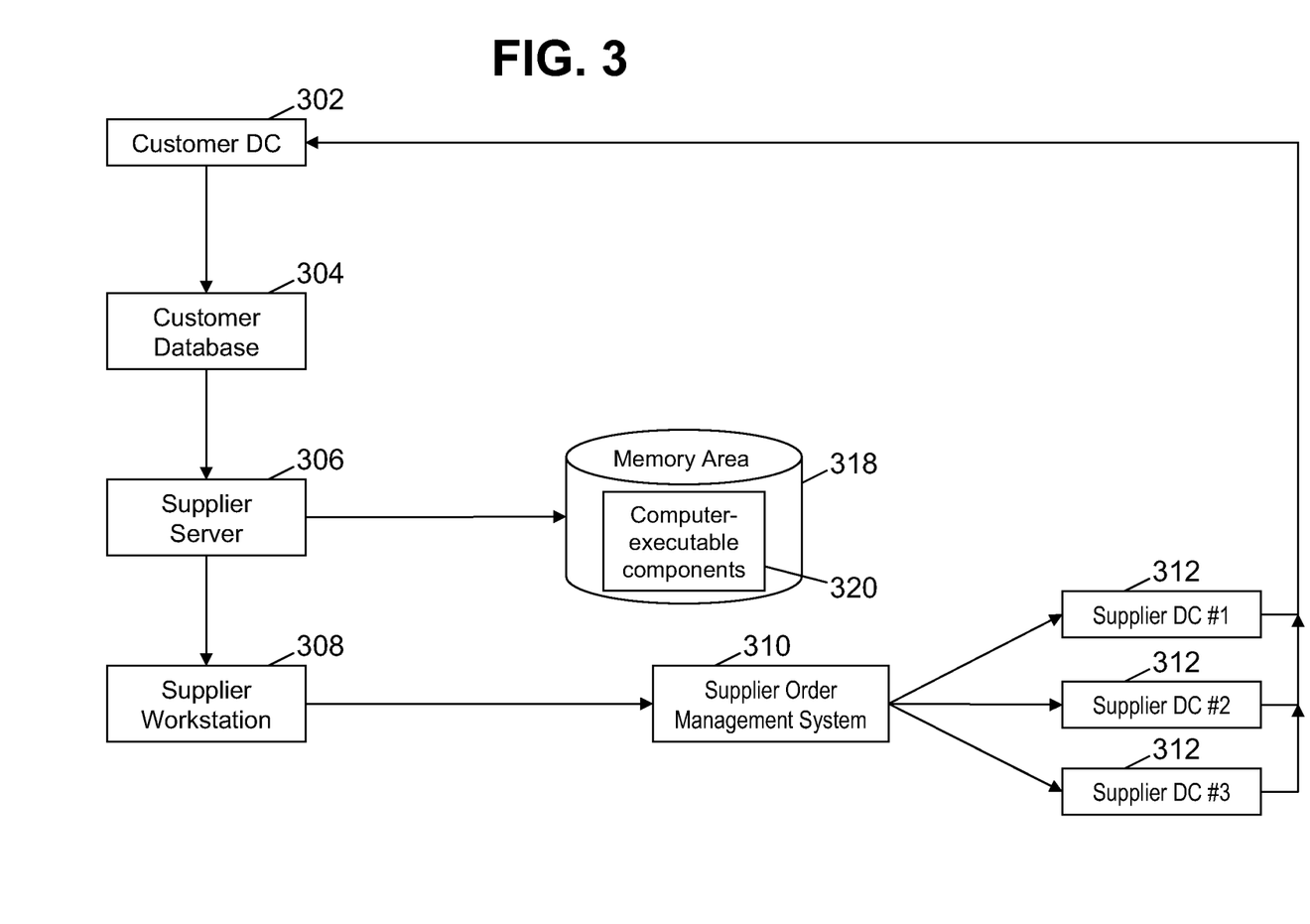
FIG. 3 illustrates an information flow occurring at prescribed times (e.g., daily).

Referring next to FIG. 3, a block diagram illustrates the components involved in an exemplary operating environment of an embodiment of the invention. Supplier DCs 312 such as supplier DC #1, supplier DC #2, and supplier DC #3 notify a customer DC 302 of upcoming shipments. The customer DC 302 stores activity data of the customer DC 302 including inventory levels and outflow (e.g., from the previous day) in a customer database 304. A supplier server 306 receives or obtains the inventory level and outflow data from the customer database 304. Computer-executable instructions execute on a supplier workstation 308 or other computing device to receive and analyze the inventory levels and outflow data from the supplier server 306 to adjust the next regular shipment and create exceptions based on the analysis. The resulting orders are automatically or manually entered into an order management system 310. The orders are communicated to the supplier DCs 312.

The computer-executable instructions executed by the supplier workstation 308 may be embodied as computer-executable components 320 stored in a computer-readable media or other memory area 318. In an embodiment, the memory area 318 stores the received, current inventory levels from the customer database 304. Exemplary computer-executable components include a design component, an assessment component, and an implementation component. The design component schedules shipments of the products from a first location to a second location as a function of the expected outflow of the products from the second location and as a function of the desired inventory level for the products at the second location. The assessment component compares current inventory levels for the products at the second location with corresponding predefined minimum and maximum inventory levels for the products at the second location. The implementation component adjusts the shipments scheduled by the design component as a function of the comparison performed by the assessment component. For example, adjusting the shipments includes withholding, from the scheduled shipments, quantities of products having a current inventory level greater than the corresponding maximum inventory level. In another example, adjusting the shipments includes adding, to the scheduled shipments, quantities of products having a current inventory level less than the corresponding minimum inventory level.

Exemplary Methods for Allocating Grabs to Fixed Trucks

Two example methods are described below for allocating grabs to the fixed trucks in a lane (e.g., constructing a cycle). Each lane represents a shipment between DCs. Grab allocation is performed on all lanes. Different lanes may use either of the methods described below, or use other methods within the scope of aspects of the invention.

For both methods described below, a decision is made up front as to the maximum grabs per truck for each of the fixed trucks to be built. The determination of the maximum grabs per truck is a function of various factors including, for example, the capacity of the truck and the size of each grab. This maximum value helps to ensure that the trucks hold everything assigned to them yet have a desired amount of empty grabs (e.g., space for exception grabs). An empty grab represents an available amount of space on a truck corresponding to the space one grab would consume. In the description below, the quantity of unallocated grabs may be a negative value. This corresponds to a situation where the grabs-per-cycle of a product that has been assigned to the collection of trucks exceeds the flow rate (e.g., corresponding to a rate of sale) for the product. In an embodiment, the flow rate represents the average quantity or amount of product leaving a location during a particular time period. For example, the flow rate may be expressed in grabs per week. Since the flow rates may be quantified with non-integer values, there may not be a perfect match between the trucks and the flow rates. Also, a decision is also made up front as to the maximum overallocation of grabs for any product (e.g., SKU) to the collection of trucks. This value is expressed as a negative number.

The first method described below produces low, reduced, or minimal swings in product inventory levels. In this method, the collection of fixed trucks is similar. With proper spacing of the trucks throughout the cycle, this allocation gives relatively frequent, small injections of product into the customer DC thereby keeping the customer DC inventory levels relatively low. Operations performed in the first method for each lane include:

1. The flow rates for each SKU (e.g., product) that are shipped in the lane from a particular DC are calculated from either forecast or recent-history outflow from the particular DC.
2. The value for the "Unallocated Grabs" for each SKU is set to be equal to the flow rate for that SKU.
3. For each Fixed Truck:
   a. The Unallocated Grabs are summed across all SKUs as sum "S". If there is less than one unallocated grab then do not complete the remaining operations in step 3 for this truck.
   b. For each SKU:
      i. If there are less than zero unallocated grabs then this SKU is ignored and step 3 is repeated for the next SKU. Otherwise, the process proceeds with the remaining steps (ii) and (iii) for this SKU.
      ii. The lesser of the following two quantities rounded down to the nearest integer are allocated to the current fixed truck:
         1. The unallocated grabs minus the maximum overallocation value (which is a negative value).
         2. A value of 0.5 is added to the ratio of the product of the unallocated grabs times the maximum grabs per truck to S as calculated above.
      iii. The unallocated grabs are debited for the SKU by the amount allocated to the current truck in (ii).
4. The final truck of the fixed trucks is inspected for total grab count. If the total grab count is less than a threshold value (e.g., 10 grabs), the truck is discarded.
5. A determination (e.g., subjective judgment) is made as to when each of the Fixed Trucks will ship. The more evenly the trucks are spread out throughout the cycle, the lower the swing in the ideal inventory pattern.

An example of this first method is shown in Table 1 below. The residual is the sum across SKUs of unallocated grabs after the current truck has been built or designed. For example, acknowledging the existence of trucks T1 and T2, there are 43.1 grabs per week of unallocated grabs awaiting assignment. In the example below, there are 32 grabs/truck, and (−1) is the maximum negative remainder (e.g., maximum overallocation of grabs). The R values represent the residual for each SKU after each truck.

TABLE 1

Example of First Method for Allocating Grabs.

| SKU | Grabs/week | T1 | R1 | T2 | R2 | T3 | R3 | T4 | R4 |
|---|---|---|---|---|---|---|---|---|---|
| SKU A | 71.5 | 22 | 49.5 | 21 | 28.5 | 21 | 7.5 | 8 | −0.5 |
| SKU B | 31.0 | 9 | 22.0 | 9 | 13.0 | 10 | 3.0 | 3 | 0.0 |
| SKU C | 3.6 | 1 | 2.6 | 1 | 1.6 | 1 | 0.6 | 1 | −0.4 |
| Grab count (total for each truck) | | 32 | | 31 | | 32 | | 12 | |
| Residual (total of unallocated grabs) | | | 74.1 | | 43.1 | | 11.1 | | −0.9 |

The second method, described below, produces low SKU complexity. This method creates relatively homogeneous trucks with the highest-flow SKUs. As a result of this method, the lowest-flow SKUs are grouped together in "junk trucks." Operations performed in this second method for each lane include:

1. The flow rates for each SKU that is shipped in the lane from a particular DC are calculated from either forecast or recent-history outflow for the SKU from the particular DC.
2. The value for the "Unallocated Grabs" for each SKU is set to be equal to the flow rate for that SKU.
3. For each Fixed Truck:
   a. The unallocated grabs are summed across all SKUs. If there is less than one unallocated grab then the remaining operations in step 3 for this truck are not completed.
   b. The SKUs are sorted in descending order of unallocated grabs.
   c. For each SKU:
      i. If there are less than zero unallocated grabs then this SKU is ignored and step 3 is repeated for the next SKU. Otherwise, the process proceeds with the remaining steps (ii) and (iii) for this SKU.
      ii. The lesser of the following two quantities are allocated to the current fixed truck:
         1. The unallocated grabs rounded to the nearest integer.
         2. The maximum grabs per truck minus the number of the grabs already allocated to the current fixed truck.
      iii. The unallocated grabs for the SKU are debited by the amount allocated to the current truck in (ii).
4. The final truck of the fixed trucks is inspected for total grab count. If the total grab count is less than a threshold value (e.g., 10 grabs), the truck is discarded.
5. A determination (e.g., subjective judgment) is made as to when each of the Fixed Trucks will ship. The more evenly the trucks are spread out throughout the cycle, the lower the swing in the ideal inventory pattern.

An example of the second method for allocating grabs is shown in Table 2 below. In this example, there are 32 grabs per truck.

TABLE 2

Example of Second Method for Allocating Grabs.

| SKU | Grabs/week | T1 | R1 | T2 | R2 | T3 | R3 | T4 | R4 |
|---|---|---|---|---|---|---|---|---|---|
| SKU A | 71.52 | 32 | 39.52 | 32 | 7.52 | 1 | 6.52 | 7 | −0.48 |
| SKU B | 30.96 | 0 | 30.96 | 0 | 30.96 | 31 | −0.04 | 0 | −0.04 |
| SKU C | 3.65 | 0 | 3.65 | 0 | 3.65 | 0 | 3.65 | 4 | −0.35 |
| Grab count (total for each truck) | | 32 | | 32 | | 32 | | 11 | |
| Residual (total of unallocated grabs) | | | 74.1 | | 42.1 | | 10.1 | | −0.9 |

Tables 3 and 4 below provide additional examples of embodiments of the invention in operation. The tables below provide exemplary data for three SKUs in one lane at a particular instance in time. Table 3 shows exemplary deadband limits.

TABLE 3

Exemplary Deadband Limits.

| Cust DC | SKU | Lane | Flow (grabs/day) | Leadtime Days | Swing (days) | Std (days) | Buffer (days) | MIN (grabs) | AVG (grabs) | MAX (grabs) |
|---|---|---|---|---|---|---|---|---|---|---|
| C1 | SKU A | S1_C1 | 5.9 | 2 | 1.9 | 0.27 | 1.4 | 9.1 | 23.0 | 36.9 |
| C1 | SKU B | S1_C1 | 10.8 | 2 | 1.8 | 0.23 | 1.2 | 15.8 | 38.4 | 61.0 |
| C1 | SKU C | S1_C1 | 0.6 | 2 | 1.7 | 0.33 | 1.7 | 1.0 | 2.5 | 4.0 |

Table 4 shows exemplary exception data.

TABLE 4

Exemplary Exception Data.

| Lane | Ideal Inv (grabs) | Current Inv (grabs) | Active Exceptions (grabs) | Adjusted Inv (grabs) | Deficit to Ideal Inv (grabs) | Position in Cycle | Exception Rule | Action: Exception (grabs) |
|---|---|---|---|---|---|---|---|---|
| S1_C1 | 27.0 | 39.7 | 0.0 | 39.7 | −12.7 | 3 | MAX | −13.0 |
| S1_C1 | 46.5 | 66.0 | 0.0 | 66.0 | −19.5 | 3 | MAX | −20.0 |
| S1_C1 | 2.9 | 4.3 | 0.0 | 4.3 | −1.4 | 3 | MAX | −2.0 |

Table 5 below provides descriptions of exemplary meanings of the terms in Tables 3 and 4 above.

TABLE 5

Exemplary Meanings of Terms.

| | |
|---|---|
| Cust DC | Identifies the Customer DC. |
| SKU | Identifies the SKU. |
| Lane | Identifies a Supplier DC and a Customer DC pair. |
| Flow | Forecast or recent-history average rate of outflow of product from the Customer DC for that SKU. |
| Leadtime Days | Maximum days between shipments of that SKU to the Customer DC. |
| Swing | Maximum amount of variation in the Customer DC inventory level for the SKU in a theoretical calculation that assumes a constant outflow rate and no outflow variability. This is expressed in terms of days of flow. |
| Std | The standard deviation of the outflow rate from the Customer DC for that SKU. This is either a calculated value from recent-history data or a forecasted value. This is expressed in terms of days of flow. |
| Buffer | An amount of inventory that is "added" (twice) to the Swing to create the difference between the MIN and MAX. |
| MIN | The lower deadband limit on the inventory at the Customer DC. |
| AVG | The midpoint of MIN and MAX. |
| MAX | The upper deadband limit on the inventory at the Customer DC. |
| Ideal Inv | The ideal inventory level at a point in time during the current cycle ("Position in Cycle"). |
| Current Inv | The on-hand inventory at the Customer DC at a point in time. |
| Active Exceptions | The amount of product generated via exceptions that has not been received at the Customer DC. |
| Adjusted Inv | Current Inv plus Active Exceptions. |
| Deficit to Ideal | Current Inv minus Ideal Inv. |
| Position in Cycle | Where a point in time falls in the current cycle. For example, if there is a seven-day cycle that begins on Sunday and the point in time is Tuesday, then the Position in Cycle is 3. |
| Rule | If the Adjusted Inv exceeds the MAX, then this value shows "MAX." If the Adjusted Inv falls below the MIN, then this value shows "MIN." If the Adjusted Inv is within the deadband limits, then this value is NULL or blank. |
| Exception | If the Rule is either MIN or MAX, then Exception represents the number of grabs between Adjusted Inv and Ideal Inv. This is the Add or Withhold exception amount (for MIN and MAX, respectively). |

Table 6 below shows example data representing an ideal inventory pattern corresponding to SKU A in Tables 1, 2, and 3 above. The ideal inventory levels shown in Table 6 account for the incoming flow of product according to the fixed trucks schedule and their contents, and assumes a constant outflow from the customer DC in accordance with the flow rate used to design the trucks.

TABLE 6

Exemplary Data Representing an Ideal Inventory Pattern.

| Position in Cycle | Ideal (grabs) |
|---|---|
| 1 | 18.7 |
| 2 | 22.9 |
| 3 | 27.0 |
| 4 | 21.1 |
| 5 | 26.3 |
| 6 | 20.4 |
| 7 | 24.6 |

Exemplary Operating Environment

A computing device or computer such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computer may operate in a networked environment using logical connections to one or more remote computers, such as a remote computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable instructions embodied in one or more computer-executable components stored on one or more computer-readable media to implement aspects of the invention described and/or illustrated herein.

The embodiments illustrated and described herein constitute exemplary means for determining an expected outflow of a product from a location, exemplary means for calculating a minimum inventory level and a maximum inventory level for the product as a function of the expected outflow of the product and a desired inventory level for the product, exemplary means for receiving, from the location, a current inventory level for the product, exemplary means for comparing the received current inventory level to the minimum inventory level and to the maximum inventory level, exemplary means for determining a quantity of the product to ship to the location as a function of said comparing, exemplary means for defining a fixed quantity of the product to ship at regular intervals to the location, and exemplary means for adjusting the fixed quantity of the product as a function of the determined quantity.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
memory for storing current inventory levels of products, the memory further storing minimum inventory levels and maximum inventory levels for each of the products; and
a processor configured to execute instructions in order to cause the system to:
generate a shipment schedule for a first time period indicating a plurality of scheduled shipments of the products to a location, the plurality of scheduled shipments being defined to occur at regular intervals during the first time period, each scheduled shipment including a quantity of products for the location; and
generate a minimum inventory level and a maximum inventory level for each product based on the shipment schedule and stock flow for the product at the location;
wherein, at a plurality of intervals occurring during the first time period, the system is further configured to:
receive current inventory levels of products for the location;
determine first products having current inventory levels below the generated respective minimum inventory level for the product at the location;
determine second products having current inventory levels above the generated respective maximum inventory for the product at the location;
determine add exceptions for the first products based on a comparison of current inventory levels of the first products to the generated respective minimum inventory levels for the first products at the location, the add exceptions representing respective quantities of ones of the first products to add to one or more scheduled shipments for the location;
determine withhold exceptions for the second products based on a comparison of current inventory levels of the second products to the generated respective maximum inventory levels for the second products at the location, the withhold exceptions representing respective quantities of ones of the second products to withhold from one or more scheduled shipments for the location;
apply the determined withhold exceptions to one or more scheduled shipments for the location; and
after applying the determined withhold exceptions, apply the determined add exceptions to one or more scheduled shipments for the location.

2. The system of claim 1, further comprising an order management system, wherein the processor is further configured to enter the determined withhold exceptions and the determined add exceptions into the order management system.

3. The system of claim 1, wherein the processor is further configured to adjust a quantity of one or more of the products to ship to the location as a function of said comparing of current inventory levels of products to minimum inventory levels or as a function of said comparing of current inventory levels of products to maximum inventory levels.

4. The system of claim 1, further comprising an assessment component for calculating the minimum inventory level and for calculating the maximum inventory level.

5. The system of claim 1, further comprising an implementation component for adjusting the scheduled shipments as a function of the determined withhold exceptions and the determined add exceptions.

6. The system of claim 1, further comprising a design component for defining the shipments of the products from said one of the locations to another location.

7. The system of claim 1, wherein the location comprises a distribution center.

8. The system of claim 1, wherein the memory and the processor are associated with a supplier distribution center.

9. The system of claim 1, wherein a shipment of the plurality of scheduled shipments of products comprises a fixed quantity of one or more of the products.

10. The system of claim 1, wherein the determined withhold exceptions and the determined add exceptions are applied to the same one or more scheduled shipments.

11. A method comprising:
generating information for a first time period regarding a plurality of scheduled shipments of products to a location, the shipments scheduled to occur at set intervals during the first time period, each scheduled shipment including a quantity of products for the location;
generating a minimum inventory level and a maximum inventory level for each product based on the shipment schedule and stock flow for the product at the location; and
at each of a plurality of intervals occurring during the first time period:
receiving current inventory levels of products for the location;
determining first products having current inventory levels below the generated respective minimum inventory levels for the product at the location;
determining second products having current inventory levels above the generated respective maximum inventory levels for the product at the location;
determining, by a computing device having one or more hardware computer processors, add exceptions for the first products, the add exceptions representing respective quantities of ones of the first products to add to one or more of the plurality of scheduled shipments to the location, said determining based on a comparison of current inventory levels of the first products to the generated respective minimum inventory levels for the first products at the location;
determining, by the computing device, withhold exceptions for the second products, the withhold exceptions representing respective quantities of ones of the second products to withhold from one or more scheduled shipments to the location, said determining based on a comparison of current inventory levels of the second products to the generated respective maximum inventory levels for the second products at the location;
applying the determined withhold exceptions to one or more of the plurality of scheduled shipments for the location; and
after applying the determined withhold exceptions, applying the determined add exceptions to the one or more of the plurality of scheduled shipments for the location.

12. The method of claim 11, further comprising submitting the determined withhold exceptions and the determined add exceptions to an order management system.

13. The method of claim 11, wherein the location is a distribution center.

14. The method of claim 11, wherein quantities of the products are shipped in containers, wherein at least some containers maintain a reserve capacity to accommodate adjustment of the quantities of the products.

15. The method of claim 11, wherein comparing the current inventory levels of products to maximum inventory levels comprises determining a maximum inventory level for a product based at least on a minimum inventory level, a range of desired inventory level, and a buffer value.

16. The method of claim 11, wherein comparing the current inventory levels of products to minimum inventory levels comprises determining a minimum inventory level for a product based at least on expected outflow of the product from the location and a safety stock quantity.

17. The method of claim 11, further comprising scheduling an additional shipment for a portion of the add exceptions if insufficient capacity exists for the add exceptions on the plurality of the scheduled shipments.

18. The method of claim 17, wherein the additional shipment is sourced from a location having quantities of multiple ones of the first products and the additional shipment comprises quantities of multiple ones of the first products.

19. A non-transitory computer-readable medium having stored thereon instructions that, in response to execution by a computing system, cause the computing system to perform operations comprising:
generating for a first time period a plurality of scheduled shipments of products to a location at regular intervals during the first time period, each scheduled shipment including a quantity of products for the location; and
generating a minimum inventory level and a maximum inventory level for each product based on the shipment schedule and stock flow for the product at the location;
wherein, at a plurality of intervals occurring during the first time period, the computing system further performs operations comprising:
receiving current inventory levels of the products for the location;
determining first products having current inventory levels below the generated minimum inventory levels at the location;
determining second products having current inventory levels above the generated maximum inventory levels at the location;
accessing the plurality of scheduled shipments of products to the location;
reducing quantities of the second products in one or more of the plurality of scheduled shipments of products to the location based on a comparison of current inventory levels of the second products to the generated respective maximum inventory levels for the second products at the location; and
increasing quantities of the first products in one or more of the plurality of scheduled shipments of products to the location based on a comparison of current inventory levels of the first products to the generated respective minimum inventory levels for the first products at the location.

20. The computer-readable medium of claim 19, wherein the location is a distribution center.

21. The computer-readable medium of claim 19, wherein quantities of the products are shipped in containers, wherein at least some containers maintain a reserve capacity to accommodate adjustment of the quantities of the products.

22. The computer-readable medium of claim 19, wherein the increased quantities of the first products replace at least some of the decreased quantities of the second products in shipping containers associated with the plurality of scheduled shipments.

23. The computer-readable medium of claim 19, wherein determining desired minimum inventory levels and desired maximum inventory levels comprises determining a maximum inventory level for a product based at least on a minimum inventory level, a range of desired inventory level, and a buffer value.

24. The computer-readable medium of claim 19, wherein determining desired minimum inventory levels and desired maximum inventory levels comprises determining a minimum inventory level for a product based at least on expected outflow of the product from the location and a safety stock quantity.

25. The computer-readable medium of claim 19, wherein the operations further comprise scheduling an additional shipment for a portion of the increased quantities of the first products if insufficient capacity exists for the increased quantities of the first products on the plurality of the scheduled shipments.

26. The computer-readable medium of claim 25, wherein the additional shipment is sourced from a location having quantities of multiple ones of the first products and the additional shipment comprises quantities of multiple ones of the first products.

27. The system of claim 1, wherein the first time period comprises at least one month and the intervals occurring during the first time period are daily intervals.

* * * * *